United States Patent
Yamamoto et al.

(10) Patent No.: US 7,840,822 B2
(45) Date of Patent: Nov. 23, 2010

(54) NETWORK COMMUNICATION SYSTEM AND A POWER FEEDING APPARATUS FOR A NETWORK HUB

(75) Inventors: Yuzo Yamamoto, Hitachinaka (JP); Kazunori Tobita, Naka (JP); Toshio Sawahata, Hitachi (JP); Hideyuki Higo, Tokyo (JP); Mitsuo Ikeda, Tokyo (JP)

(73) Assignee: Japan Atomic Energy Agency, Ibaraki (JP)

( * ) Notice: Subject to any disclaimer, the term of this patent is extended or adjusted under 35 U.S.C. 154(b) by 712 days.

(21) Appl. No.: 11/847,674

(22) Filed: Aug. 30, 2007

(65) Prior Publication Data
US 2008/0155283 A1    Jun. 26, 2008

(30) Foreign Application Priority Data
Dec. 20, 2006    (JP) .............................. 2006-342672

(51) Int. Cl.
G06F 1/26    (2006.01)
(52) U.S. Cl. ....................... 713/300; 713/340
(58) Field of Classification Search ................. 713/300, 713/340
See application file for complete search history.

(56) References Cited

U.S. PATENT DOCUMENTS

2007/0088823 A1*  4/2007  Fowler et al. ............... 709/224
2007/0288771 A1* 12/2007  Robbins ..................... 713/300
2008/0005601 A1*  1/2008  Diab .......................... 713/300

FOREIGN PATENT DOCUMENTS

JP    09-261264    10/1997
JP    2004-171558   6/2004

* cited by examiner

*Primary Examiner*—Tse Chen
(74) *Attorney, Agent, or Firm*—Mattingly & Malur, P.C.

(57) ABSTRACT

To make such an ordinary hub as works on the power fed through a power adapter connected to a commercial power supply be capable of maintaining its hub-function without interruption even when a commercial power supply failure occurs. The ordinary hub is connected to a line securement power supply unit 8 that is power-fed from a POE-compliant power-feeding hub 3 through a communication cable 5c, wherein a means for producing a power for an ordinary hub using a power fed through said communication cable 5c so as to feed produced power to an ordinary hub 2; and a storage battery 806, which stores power while power-receiving, to be used as the power source for producing a power for said ordinary hub when a power failure, are provided in said line securement power supply unit 8.

2 Claims, 2 Drawing Sheets

NETWORK COMMUNICATION SYSTEM AND A POWER FEEDING APPARATUS FOR A NETWORK HUB

BACKGROUND OF THE INVENTION

The present invention relates to a power feeding apparatus for a network hub installed within a network communication complex, and a network communication system that uses said power feeding apparatus.

There are two types of hubs commonly used in a network communication complex. One type of hub is such a hub as works on a power fed through an AC/DC power adapter connected to a commercial power supply. The other type of hub is such a hub as works on the "Power Over Ethernet (POE)" (Registered trademark). In the latter practice, the power is fed through a communication cable (Ethernet Cable) connected to a POE-compliant power-feeding hub (Ethernet is a registered trademark).

A hub working on the power fed from an AC/DC power adapter connected to a commercial power supply (herein after this type of hub is referred to as an ordinary hub) becomes disabled for communication relaying function (the hub function) if the commercial power supply fails, because a power supply failure causes an interruption in the power feeding to the hub. Therefore, a network communication system that uses the ordinary hub for communication relaying encounters such a problem that the system will be disabled from communicating because the ordinary hub will lose its communication relaying function if a commercial power supply failure occurs.

The ordinary hub on the other hand requires being installed near to the distribution facility of a commercial power supply. Locational consideration is required.

A POE-compliant power-receiving hub that works on the power fed from a POE-compliant power-feeding hub through a communication cable may be installed in a place where a commercial power supply is not available. However, the length of the communication cable acceptable to the system in this usage is limited. The POE-compliant power-receiving hub must be installed within an area of which distance from the POE-compliant power-feeding hub is not greater than 100 m.

Therefore, a network communication system that intends to relay communications using said POE-compliant power-receiving hub encounters such a designing problem that the system must be configured so that the hub should be located always within a limited area.

Further, in a POE-compliant power-feeding hub that works on a commercial power supply, a failure in a commercial power causes the hub to lose its power feeding function and communications relaying function. This loss of functions develops to the failure in the power feeding to a POE-compliant power-receiving hub that is dependent to said POE-compliant power-feeding hub causing an interruption in the communications relaying. This is a problem in that the communication function in a network communication system is disabled.

Where the system uses a POE-compliant power-feeding hub that works on an uninterruptible power supply apparatus having a built-in power storage device, said POE-compliant power-feeding hub and said POE-compliant power-receiving hub can work without interruption of their power reception from the uninterruptible power supply apparatus. Then, the system can maintain communication relaying.

As stated above however, the length of the communication cable acceptable to the system configuration is limited. Said POE-compliant power-receiving hub must be installed within an area of which distance from a POE-compliant power-feeding hub is not greater than 100 m. Therefore, a network communication system that intends to relay communications using such POE-compliant power-receiving hub encounters a designing problem such that the system must be configured so that the hub should be located always within a limited area.

Moreover, the uninterruptible power supply apparatus is expensive, which increases problematically the cost of a network communication system.

For instance, these prior arts are described in JP 9-261264 A and JP 2004-171558 A.

BRIEF SUMMARY OF THE INVENTION

To actualize a hub that is capable of maintaining communications relaying without interruption even when a commercial power supply failure occurs, two typical configuration may be listed as the feasible measure therefor. One is using an uninterruptible power supply apparatus that incorporates a power storage device so that the storage device will serve as a relief power source when a power failure occurs. The other is installing, within 100 m from a POE-compliant power-receiving hub, a POE-compliant power-feeding hub that works on an uninterruptible power supply apparatus.

These configurations, however, make the composition of network communication lines complicated with increased cost, and are accompanied by a difficulty in applying the system to an existing network communication system.

An object of the present invention is to provide a power feeding apparatus that is capable of supplying power to the ordinary hub used in an existing network communication system for configuring said existing system even when a commercial power supply failure occurs.

Another object of the present invention is to maintain the network communications by keeping the ordinary hub used in an existing network communication system for configuring said existing system able to relay communications even when a commercial power supply failure occurs.

A further object of the present invention is to enable the relaying of communications using the ordinary hub even in a place where the commercial power distribution facility is not available.

A power feeding apparatus for a network hub according to one aspect of the present invention is comprised of: a first communication cable connector to which a communication cable is connected, wherein the other end of said communication cable is connected to a communication cable connector on a POE-compliant power-feeding hub; and a second communication cable connector to which a communication cable is connected, wherein the other end of said communication cable is connected to a communication cable connector on an ordinary hub that works on a power fed from a power adapter connected to a commercial power supply; a signal passing circuitry means for making communication signals pass between corresponding communication line pins in said first and second communication cable connectors; and a power producing means that charges a storage battery using a power supplied at the power source pins in said first communication cable connector and produces a predetermined voltage of power using said storage battery or said power supplied at said power source pins to output for feeding said ordinary hub with said voltage of power through a power feeding cable.

A network communication system according to another aspect of the present invention is a network communication system having a communication terminal connected to a communication cable connector on an ordinary hub, which works on a power fed from a power adapter connected to a commercial power supply through a communication cable, and a POE-compliant power-feeding hub, wherein said system is characterized in that: a communication cable connector on said POE-compliant power-feeding hub and a first communication cable connector on said power feeding apparatus are connected through a communication cable, a second communication cable connector on said power feeding apparatus and said communication cable connector on said ordinary hub are connected through a communication cable, and a power supplied from said power feeding apparatus is fed to said ordinary hub through a power feeding cable.

The present invention actualizes a power feeding apparatus that is capable of supplying power to the ordinary hub used in an existing network communication system for configuring said existing system even when a commercial power supply failure occurs.

The present invention maintains the network communications by keeping the ordinary hub used in an existing network communication system for configuring said existing system able to relay communications even when a commercial power supply failure occurs.

The present invention enables relaying communications using the ordinary hub even in a place where the commercial power distribution facility is not available.

BRIEF DESCRIPTION OF THE SEVERAL VIEWS OF DRAWINGS

DETAILED DESCRIPTION OF THE INVENTION

According to the present invention, a communication network system that has a communication terminal and a POE-compliant power-feeding hub, wherein said terminal is connected to a communication cable connector on an ordinary hub through a communication cable and said ordinary hub is such a hub as works on the power fed from a power adapter connected to a commercial power supply, is configured in a manner: such that a communication cable connector on said POE-compliant power-feeding hub and a first communication cable connector on said power feeding apparatus for a hub are connected through a communication cable; such that a second communication cable connector on said power feeding apparatus for a hub and said communication cable connector on said ordinary hub are connected through a communication cable; and such that a power supplied from said power feeding apparatus for a hub is fed to said ordinary hub through a power feeding cable.

In this configuration, said power feeding apparatus for a hub has: a first communication cable connector to which a communication cable is connected, wherein the other end of said communication cable is connected to the communication cable connector on a POE-compliant power-feeding hub; a second communication cable connector to which a communication cable is connected, wherein the other end of said communication cable is connected to the communication cable connector on an ordinary hub that works on a power fed from a power adapter connected to the commercial power supply; a signal passing circuitry means for making communication signals pass between corresponding communication line pins of said first and second communication cable connectors; and a power producing means that charges a storage battery using a power supplied at the power source pins of said first communication cable connector and produces a predetermined voltage of power using said storage battery or said power supplied on said power source pins to output for feeding said ordinary hub with said voltage of power through a power feeding cable.

Embodiment 1

Figure 1:
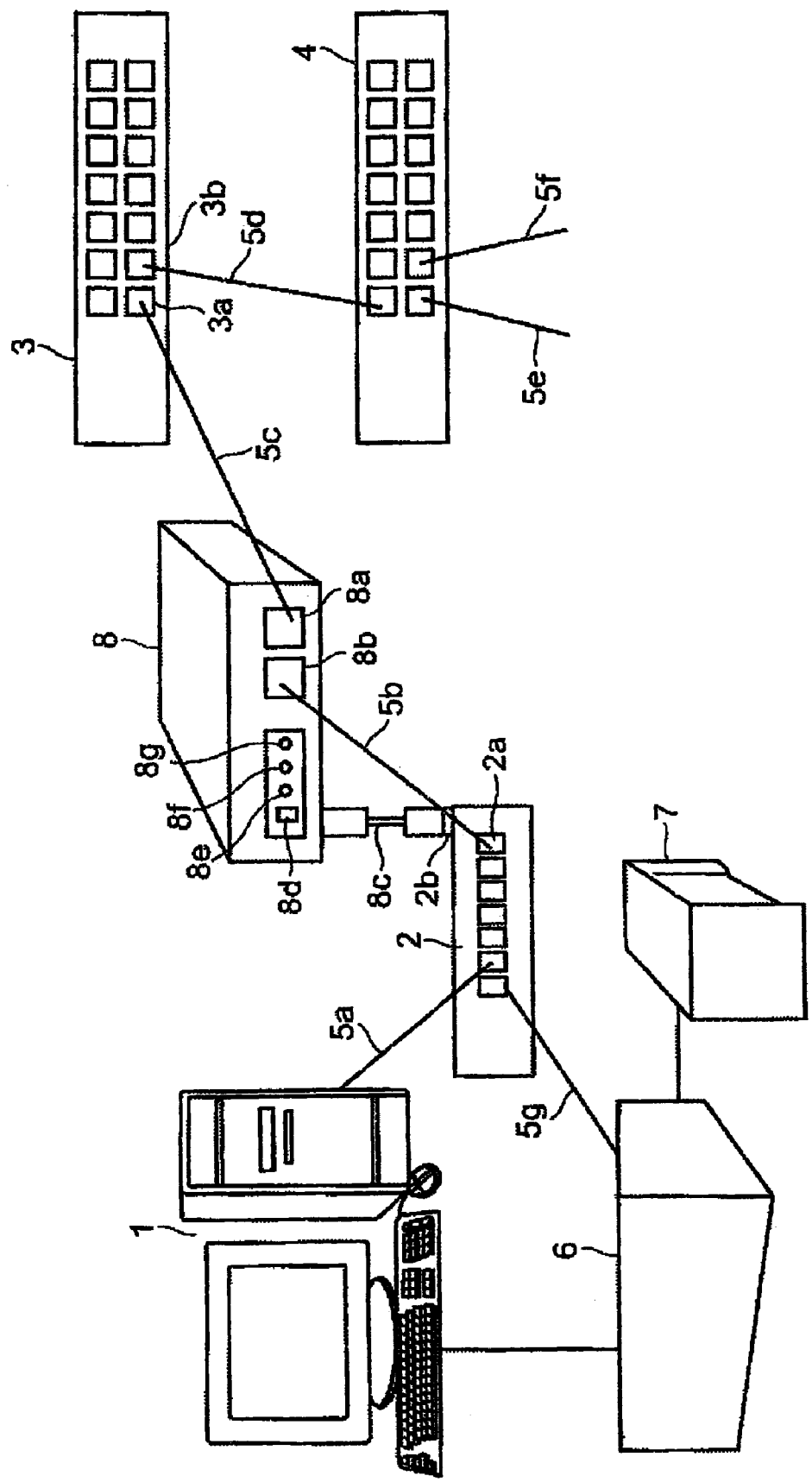
FIG. 1 is a block diagram of a network communication system according to the present invention.

FIG. 1 is a block diagram of a network communication system, wherein a power feeding apparatus for a network hub according to the present invention is used.

As shown in FIG. 1, a main communication terminal equipment 1, such as an emergency call unit or a database server, performs communication with other various communication terminal equipment through communication cables 5a, 5b, 5c, 5d, 5e, 5f, and 5g involving an ordinary hub 2, a POE-compliant power-feeding hub 3, and a POE-compliant power-receiving hub 4.

A status-monitoring unit 6, for example, connected in the system through the communication cable 5g can be one of feasible communication terminals in this embodiment other than listed above. Said status-monitoring unit 6 is designed to work on the power feeding from an uninterruptible power supply unit 7.

Said main communication terminal equipment 1 is designed to work on a built-in uninterruptible power supply section, or, on the power fed from said uninterruptible power supply unit 7.

Said ordinary hub 2 is such a hub as works usually on the power fed from a power adapter connected to a commercial power supply receiving said power at a power adapter connector provided on said hub through a power feeding cable of said power adapter. In this embodiment 1, said ordinary hub 2 is installed in such a manner that it works on the power fed from a line securement power supply unit 8, which is a power feeding apparatus for a network hub, receiving said power at the power adapter connector provided on said hub so that said hub can maintain its function even when a commercial power supply failure occurs. For such a type of the ordinary hub that the system is tolerant of the non-functioning of the hub (this type of hub is not shown in the figures) while the commercial power supply failure, the hub may be installed in such a manner that it works on the power fed from a power adapter connected to a commercial power supply receiving said power at the power adapter connector provided thereon.

Said POE-compliant power-feeding hub 3 works on a self-produced internal power using a commercial power supply. A part of said internal power is shared with a POE-compliant power-receiving hub 4 and said line securement power supply unit 8 through a power feeding thereto via communication cables 5c or 5d in a superposing technique. Said POE-compliant power-feeding hub 3 in the embodiment 1 is configured to function on the power source internally produced from a commercial power supply, however, it may be also practicable to configure said hub to work on a power fed from an uninterruptible power supply system.

Said line securement power supply unit 8 has: a communication cable connector 8a to which said communication cable 5c is connected, wherein the other end of said communication cable 5c is connected to a communication cable connector 3a on said POE-compliant power-feeding hub 3; a communication cable connector 8b to which said communication cable 5b is connected, wherein the other end of said communication cable 5b is connected to a communication cable connector 2a on said ordinary hub 2; a power feeding cable 8c connected so that an internally produced direct current power for ordinary hubs can be fed to said power adapter connector on said ordinary hub 2; and a voltage selecting switch 8*d* and indicator lamps 8*e* to 8*g*.

Said line securement power supply unit 8 has a power producing circuitry that produces a direct current power for ordinary hubs using the power obtained from said POE-compliant power-feeding hub 3 through said communication cable 5*c*, and has a signal passing circuitry that conveys (passes) only communication signals between said communication cable connectors 8*a* and 8*b*. The inside arrangement of this will be detailed later.

Said line securement power supply unit 8 is structured in such a style of housing as permits placing-on or side-by-side setup with said ordinary hub 2, wherein said power feeding cable 8*c* is connected to a power adapter connector 2*b* on said ordinary hub 2 to feed the power thereto.

Figure 2:
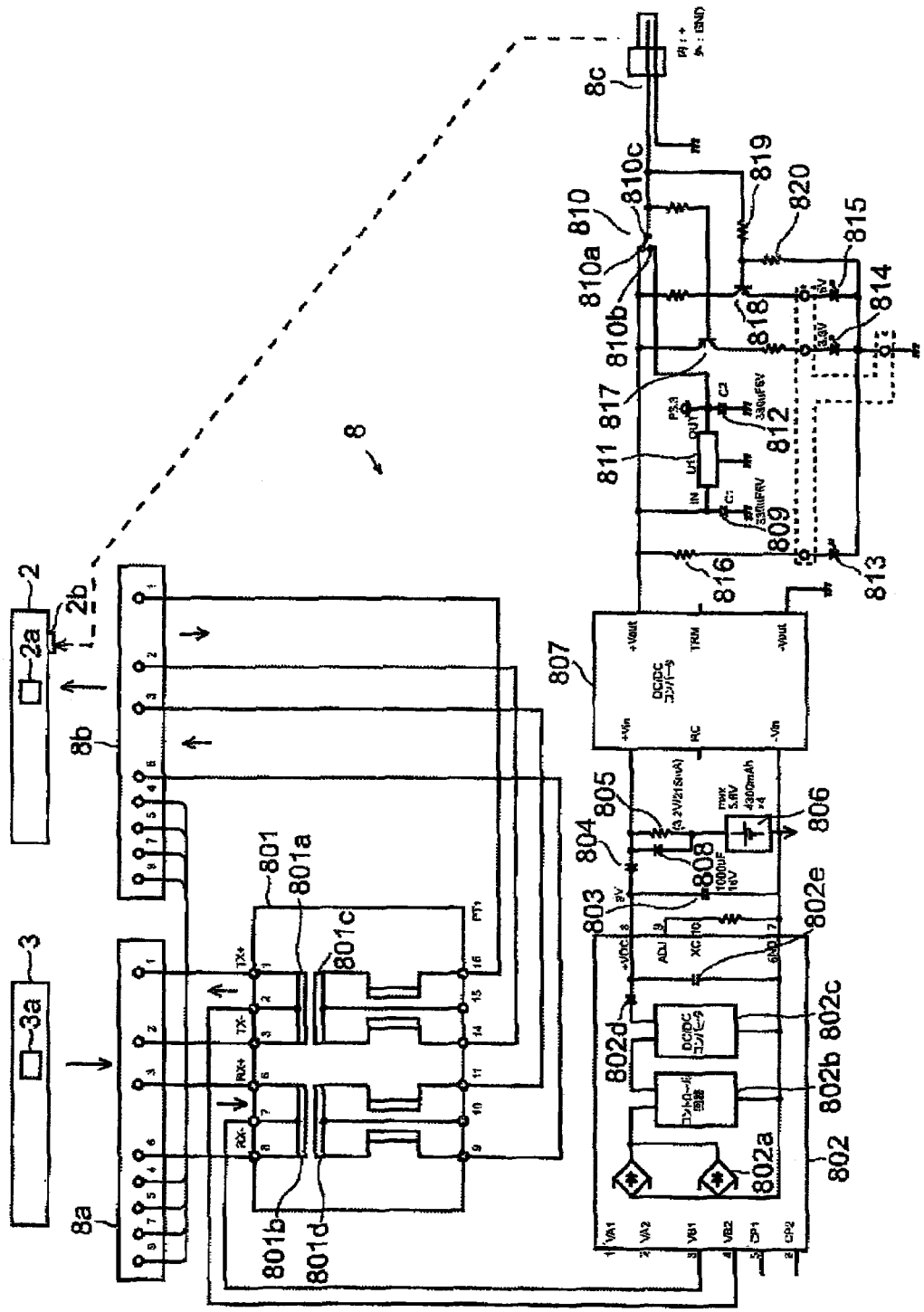
FIG. 2 is a block diagram of the circuit configuration in a line securement power supply unit.

Referring to the block diagram of circuit configuration shown in FIG. 2, the inside arrangement of said line securement power supply unit 8 is detailed as follows: Said line securement power supply unit 8 in the embodiment 1 is configured to work on a power isolated from a superposed power source (a supplying-power) on communication signal lines of said communication cable 5*c*.

The article with the symbol 801 is an isolation transformer that separates the power from the power-superposed communication signal transmitted from said POE-compliant power-feeding hub 3. Said transformer has two center-tapped primary windings 801*a* and 801*b*, and two center-tapped secondary windings 801*c* and 801*d* corresponding respectively to primary windings. Outer ends of said two primary windings 801*a* and 801*b* are connected to power-superposed terminals on said communication cable connector 8*a* to derive the power from said center tap. Outer ends of said two secondary windings 801*c* and 801*d* are connected to corresponding signal terminals on said communication cable connector 8*b* to pass communication signals. Center taps on said secondary windings 801*c* and 801*d* are terminated thereat to discontinue power feeding.

The article with the symbol 802 is a primary power producing module that outputs a primary power of a predetermined voltage (9 V d.c.) producing from a source power received from said isolation transformer 801. This module has a diode bridge 802*a*, a control circuit 802*b*, a DC/DC converter 802*c*, a backflow preventing diode 802*d*, and a filtering capacitor 802*e*. Said primary power producing module 802 can be actualized by using, for example, Power Over Ethernet Module Ag 8000 available at Global Electronics Corporation.

The direct current voltage outputted from said primary power producing module 802 is connected to such a circuitry that said direct current voltage is filtered by a filtering capacitor 803 having a large capacity (1000 μF for example) for smoothing to charge a storage battery 806 through a backflow preventing diode 804 and a protective resistance 805.

Since any type of storage battery is usable as said storage battery 806, the embodiment 1 uses a nickel-cadmium battery. Said battery is installed in a replaceable manner so that the demanded power (4.3 Ah for example) will be assured even under a power failure.

The article with symbol 807 is a DC/DC converter, or a secondary power producing module, that outputs a secondary voltage (5 V d.c.), wherein the module is connected so as to receive a power from said storage battery 806 through a diode 808. Said secondary power producing module 807 can be actualized by using, for example, DC/DC Converter SUS6 available at Cosel Co., Ltd.

The direct current voltage outputted from said secondary power producing module 807 is connected in such a circuitry that said direct current voltage is filtered by a filtering capacitor 809 having a large capacity (330 μF for example) for smoothing to lead the power to a fixed contact terminal 810*a* on a voltage selector switch 810. The terminal voltage across said filtering capacitor 809 is connected in such a circuitry that said terminal voltage is voltage-divided into 3.3 V by a voltage dividing resistor 811 for smoothing by a filtering capacitor 812 having a large capacity (330 μF for example) to feed the power to a fixed contact terminal 810*b* on said voltage selector switch 810.

A moving contact terminal 810*c* on said voltage selector switch 810 is connected so as to make contact selectively with one of said fixed contact terminals 810*a* and 810*b* to output a direct current power of 5 V or 3.3 V to said power feeding cable 8*c*. Said voltage selector switch 810 corresponds to said voltage selecting switch 8*d* shown in the block diagram in FIG. 1.

The articles with the symbols 813, 814, and 815 are indication lamps that use LEDs. Said indication lamp 813 is a power source operating status indicator lamp that lights with power feeding from an output terminal on said DC/DC converter 807 via a resistor 816. Said indication lamp 814 is a 3.3 V output indicator lamp that lights with power feeding from an output terminal on said DC/DC converter 807 via a transistor 817. Said indication lamp 815 is a 5 V output indicator lamp that lights with power feeding from an output terminal on said DC/DC converter via a transistor 818. These indication lamps 813 to 815 correspond to indication lamps 8*e*, 8*f*, and 8*g* shown in the block diagram in FIG. 1.

Said transistor 817 is a PNP transistor, whose emitter is connected to said fixed contact terminal 810*a* on said voltage selector switch 810 and whose base is connected to said moving contact terminal 810*c* on said voltage selector switch 810. When said moving contact terminal 810*c* contacts said fixed contact terminal 810*b* to output a 3.3 V direct current voltage to said power feeding cable 8*c*, said transistor becomes conductive causing said 3.3 V output indicator lamp 814 to light-on. When said moving contact terminal 810*c* contacts said fixed contact terminal 810*a* to output a 5 V direct current voltage to said power feeding cable 8*c*, said transistor becomes non-conductive causing said 3.3 V output indicator lamp 814 to light-off.

Said transistor 818 is an NPN transistor, whose collector is connected to said fixed contact terminal 810*a* on said voltage selector switch 810 and whose base is connected to the voltage-dividing point of voltage dividing resistors 819 and 820 connected to said moving contact terminal 810*c* on said voltage selector switch 810. When said moving contact terminal 810*c* contacts said fixed contact terminal 810*a* to output a 5 V direct current voltage to said power feeding cable 8*c*, said transistor becomes conductive causing said 5 V output indicator lamp 815 to light-on. When said moving contact terminal 810*c* contacts said fixed contact terminal 810*b* to output a 3.3 V direct current voltage to said power feeding cable 8*c*, said transistor becomes non-conductive causing said 5 V output indicator lamp 815 to light-off.

In such a network system configured as stated above, where the commercial power supply is in a sound working order, said ordinary hub 2 works relying on the power fed from said line securement power supply unit 8, said POE-compliant power-feeding hub 3 works relying on the power fed from the commercial power supply, and said POE-compliant power-receiving hub 4 works relying on the power fed from said POE-compliant power-feeding hub 3 through said communication cable 5d, so as to relay communication signals in a network communications.

In this, said line securement power supply unit 8 acquires, using said isolation transformer 801, its power separating from the superposed power source received at said communication cable connector 8a fed through said communication cable 5c from said communication cable connector 3a on said POE-compliant power-feeding hub 3. Further, said line securement power supply unit 8 passes communication signals through to said communication cable connector 8b.

The power separated by said isolation transformer 801 is, on one hand, converted into a direct current power by said primary power producing module 802 to charge said storage battery 806 to provide for a failure in the reception of power fed from said POE-compliant power-feeding hub 3. The separated power, on the other hand, is converted into a predetermined direct current voltage (5 V) by said DC/DC converter 807. Said direct current voltage (5 V) and another direct current voltage (3.3 V) produced from said direct current voltage (5 V) by a voltage dividing resistor 811 are lead to said voltage selector switch 810 to be selectively sent out on said power feeding cable 8c for feeding to said ordinary hub 2.

When the output voltage of said DC/DC converter 807 is active, said indication lamp 813 lights; and then said indication lamp 814 lights when said voltage selection switch 810 chooses said 3.3 V feeding power output, or said indication lamp 815 lights when said voltage selection switch 810 chooses said 5 V feeding power output.

Said ordinary hub 2 maintains its hub-function by the support of the power feeding from said line securement power supply unit 8 even when a commercial power supply failure occurs.

Said POE-compliant power-feeding hub 3 in the embodiment 1 interrupts its power feeding to said line securement power supply unit 8 as a consequence of a commercial power supply failure. However, the system is able to maintain communication relaying supported by the power feeding to said ordinary hub 2 using the power stored in said storage battery 806 should the power receiving through said communication cable 5b be interrupted due to a commercial power supply failure, because said line securement power supply unit 8 has said storage battery 806 built-therein and is charging said battery to be ready.

Said network communication system in the embodiment 1 is capable of realizing communication relaying using said ordinary hub even in such an area as has no distribution facilities of a commercial power supply system. Further, because of the fact that said ordinary hub 2 is able to maintain communication relaying by the support of the power feeding from said line securement power supply unit 8 even when a commercial power supply failure occurs, such a communication line as is able to retain communicating function in a communication network while a power outage can be actualized by using a hub that works on an interruptible power supply system or said ordinary hub 2 that works on the power supply from said line securement power supply unit 8.

Embodiment 2

In said embodiment 1, the power from said POE-compliant power-feeding hub 3 to said line securement power supply unit 8 is fed in a superimposing style on the communication line in said communication cable 5c. It may however be also practicable to modify this feeding manner into such a style as uses dedicated power feeding conductors specially provided in said communication cable 5c. In this power feeding style, said communication cable connector 8a is configured in such a manner that terminals thereon for said dedicated power feeding conductors are connected to said diode bridge 802a in said primary power producing module 802 of said line securement power supply unit 8, and terminals thereon for communication lines are linked to corresponding terminals on said communication cable connector 8b to pass communication signals only.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments, which can be embodied within a scope encompassed and equivalent thereof with respect to the feature set out in the appended claims.

The invention claimed is:

1. A power feeding apparatus for a network hub comprising: a first communication cable connector, one end of which is connected to a communication cable, and the other end is connected to a communication cable connector on a POE-compliant power-feeding hub; a second communication cable connector, one end of which is connected to the communication cable, and the other end is connected to a communication cable connector on an ordinary hub that works on a power fed from a power adapter connected to a commercial power supply; a signal passing circuitry means for making communication signals pass between corresponding communication line pins of said first and second communication cable connectors; and a power producing means that charges a storage battery using a power supplied on the power source pins of said first communication cable connector and produces a predetermined voltage of power using said storage battery or said power supplied on said power source pins to output for feeding said ordinary hub with said predetermined voltage of power through a power feeding cable.

2. A network communication system comprising: a communication terminal connected to a communication cable connector on an ordinary hub, which works on a power fed from a power adapter connected to a commercial power supply through the communication cable, and a POE-compliant power-feeding hub, wherein a communication cable connector on said POE-compliant power-feeding hub and a first communication cable connector on said power feeding apparatus for a network hub according to claim 1 are connected through the communication cable, a second communication cable connector on said power feeding apparatus for a network hub and said communication cable connector on said ordinary hub are connected through the communication cable, and a power supplied from said power feeding apparatus for a network hub is fed to said ordinary hub through a power feeding cable.

* * * * *